United States Patent
Ghazarian

(10) Patent No.: US 7,100,052 B2
(45) Date of Patent: Aug. 29, 2006

(54) ELECTRONIC VEHICLE PRODUCT AND PERSONAL MONITORING

(75) Inventor: Ohanes Ghazarian, Henderson, NV (US)

(73) Assignee: Loran Technologies, Inc., Carson City, NV (US)

( * ) Notice: Subject to any disclaimer, the term of this patent is extended or adjusted under 35 U.S.C. 154(b) by 938 days.

(21) Appl. No.: 10/060,838

(22) Filed: Jan. 30, 2002

(65) Prior Publication Data

US 2002/0104013 A1  Aug. 1, 2002

(51) Int. Cl.
*H04L 9/00*  (2006.01)

(52) U.S. Cl. ....................... 713/182; 713/185

(58) Field of Classification Search ........... 713/182, 713/185, 200, 201
See application file for complete search history.

(56) References Cited

U.S. PATENT DOCUMENTS 3,671,721 A * 6/1972 Hunn et al. ............... 235/439
3,816,708 A * 6/1974 Walton ....................... 340/5.8
3,842,246 A * 10/1974 Kohler et al. ............... 235/439

* cited by examiner

*Primary Examiner*—Thomas R. Peeso
(74) *Attorney, Agent, or Firm*—Stetina Brunda Garred & Brucker

(57) ABSTRACT

A system for detecting presence, identifying, and detecting directional movement of an object or personnel is directional movement installed at points of access for vehicle, object, or personnel tracking. The system has at least a pair of IR heat and/or motion-sensing detectors installed on a scanner panel with a space approximately 2 feet apart from each other for transmitting and receiving optical beams across the point of access. An RFID reader with an antenna is incorporated within the scanner panel. When an object passes through the point of access, the panel scanner is capable of detecting which direction the object traveled. The scanner panel also has the ability to distinguish whether the object is a human or an object. This functionality is dependent on the triggering of heat and or motion sensors/detectors, which can authenticate the objects and/or personnel carrying an RFID tag and information of the RFID tag to a computer interface.

26 Claims, 4 Drawing Sheets

ELECTRONIC VEHICLE PRODUCT AND PERSONAL MONITORING

CROSS-REFERENCE TO RELATED APPLICATIONS

STATEMENT RE: FEDERALLY SPONSORED RESEARCH/DEVELOPMENT

Not Applicable

BACKGROUND OF THE INVENTION

The present invention relates to a system and a method for tracking, storing, and maintaining objects or personnel having RFID tags attached thereto in a defined zone or geographic area such as buildings, factories, tractor-trailers, aircraft, railroad cars or other areas where the zones have plurality of points of access or within a defined area. The present invention further relates to an improved object or personnel tracking and control system which makes use of a portal RF antenna with infrared optical sensors that can scan the object or personnel RFID tag and detect and determine the direction in which objects or personnel are moving. With the use of IR heat sensing and motion sensing sensors, the presence or absence of an object without an RFID tag and the moving direction of such object as well as whether said moving object is a person or not can be determined.

A number of different methods has been used in the past to track the location of large numbers of objects (pallets of cargo, packages etc.) or personnel located within buildings, trailers, containers, buses, and aircrafts. These methods have been used for purposes of tracking cargo, employee attendance, school attendance, or logging in passenger manifest along with carry-on luggage. The oldest of this method is by keeping an inventory register of each warehouse or vehicle content and it's delivery records in a paper journal, attendance punch cards, or more recently, with the use of computers or a hand held computerized device and database. The accuracy of inventory or personnel registry depends on each individual operator to properly input information relating to packages or personnel. Such a system is limited to assessing the number of objects or pallets and cannot accurately identify the location of each and every pallet, package or personnel and entails significant costs from a human resources standpoint.

As one might expect, a variety of different approaches has been taken to solve the problem of monitoring large numbers of vehicles, cargo pallets, packages and/or personnel at a specific location (such as a warehouse or office building) or in a vehicle/trailer. From a security perspective, certain applications for purposes of monitoring cargo pallets, packages, luggage, personnel and/or passengers relating to vehicle content, warehouse site, retail stores, schools, at ports of entry, and airports also require tremendous recourses including security guards, video monitors, magnetic tag detectors, metal detectors, access controls, barcode readers as well as mechanical or optical counters. While such approaches may reduce the incident of theft, hijacking, personnel attendance, they are not useful in addressing the primary problem contemplated by the present invention, namely, how to keep track of the location of a plurality of cargo pallets, packages and/or personnel carried in various modes of transportation and/or within a defined geographic area or zone such as warehouses or buildings.

One such system is illustrated in U.S. Pat. No. 4,009,389 to Lindholm. Apparatus for the automatic counting of passengers that detects the number of passengers entering and/or leaving a collective passenger vehicle projecting a pair of light-beams of invisible light across passenger door way and detecting with the light beam in response to first and second light is disclosed.

Another example is an automatic counting system for passengers disclosed in U.S. Pat. No. 4,528,679 issued to Shahbaz et al. The automatic counting system counts the passengers moving into and out of a common carrier vehicle. Three ultrasonic detectors are used to determine the presence and absence of passengers, while the sequence of detection of passengers at the three different ranges establish a count of number of passengers entering or leaving.

U.S. Pat. No. 5,485,347 issued to Miura discloses a situation Guiding Management System used with plural of cars constituting a train, and an up/down counter for counting passengers getting on and off each car with passenger sensor/counter provided at doorways and pass ways of cars. The infrared temperature sensors element are used for sensing temperature and a pair of photo sensors serves as direction sensor for determining whether a passing passenger is getting on or off a car.

U.S. Pat. No. 5,068,537 issued to Ishikawa et al. describes a passenger number sensor System wherein a plurality of infrared ray sensors are disposed on a straight line to detect temperature change, a plurality of optical lenses are provided the corresponding one of the plurality of infrared sensors, and a counter is provided to select one of the addition value in a predetermined range according to sense pattern on the temperature change of infrared ray sensors and to add the selected addition value to accumulate count value.

U.S. Pat. No. 5,866,887 issued to Hashimoto et al describes an apparatus for detecting the number of passers. A plurality of rows of distance variation measuring sensors is provided on a ceiling. Each of the distance variation measuring sensors includes a light emitter and a light receiver in an orthogonal direction to the direction along which human pass. The number of passers is detected on the basis of the number of the distance variation measuring. The traveling direction of human bodies is detected on the basis of the change in distance.

U.S. Pat. No. 6,255,946 issued to Kim discloses a system for detecting the presence and direction of an object passing through a gate. The system uses a first and a second infrared beams to emit reflector, receives a mixed beam superimposed by the first and second beams reflected by the reflector, and determines the presence and direction of the object passing through the gate on the mixed beam U.S. Pat. No. 5,661,457 issued to Ghaffari et al. teaches a directional antenna configuration for a tracking system used in an article tracking. The antenna configuration includes a pair of shorted loops antenna one on respective side of portal. The antenna configuration also includes a second pair of passage antennas arranged in parallel to the path of travel through the doorway. The antenna configuration permits detection of direction of movement of marked object through a portal.

U.S. Pat. No. 5,708,423 issued to Ghaffari et al. discloses a zone-based tracking and Control System incorporated with a data processing system that maintains records of a plurality of objects. Each object has a marker. At least four sensor devices are installed on each side of the respective doorway. Each marked object is expected to move through the doorway. The sensor devices detect from the identification signal a direction in which object is being moved. The data processing system receives the detection signal and maintains a data record indicating object present location in the building.

U.S. Pat. No. 4,009,389 issued to Lindhom, U.S. Pat. No. 5,485,347 issued to Miura, U.S. Pat. No. 5,068,537 issued to Ishikawa et al, U.S. Pat. No. 5,866,887 issued to Hashimoto et al, and U.S. Pat. No. 6,255,946 issued to Kim discloses using optical sensors for detection of directional movement, and counting of human at an entry/exit point.

The teachings in the prior art are not capable of authenticating objects, passers or passengers passing through a particular entry/exit point. U.S. Pat. No. 4,528,679 issued to Shahbaz discloses a similar art using ultrasonic sensors instead of optical sensor. U.S. Pat. No. 5,661,457 and U.S. Pat. No. 5,708,423 issued to Ghaffari disclose asset tracking by use of multiple portal antennas for reading RFID markers and indicating directional movement of objects or personnel carrying markers. The art found in Ghaffari is useful but not practical in use. In order to fill an average trailer or building entry/exit way with RF field, an antenna loop is being used to cover an entry/exit opening area usually about 8 feet (4 m). Since RFID read antennas radiates a 360 degree RF field, as per Ghaffari teaching, in order to detect marked objects or personnel directional movements, minimum of 2 antennas use is required on one side towards an entry way (one after the other, along the entry way), these 2 antennas have to be away from each other by at least 8 feet to allow the RFID antenna reader CPU to detect directional movement of the object or person carrying marker.

First the reader must determine the actual physical location of a moving object or personnel carrying a marker by determining which one of 2 antennas interrogated first and which one interrogated second in order to register a marked object or personnel direction movement detection, depending on physical position of the object or personnel carrying RFID tag at the time of antenna reading. If antennas are less than 8 feet apart, the reader CPU cannot differentiate the tag position because both antennas can read a particular RFID tag at the same time even though Ghaffari discloses only one antenna reading being initiated by the reader CPU at a given time to avoid RF collision. Ghaffari requires a large unusable area in an entry/exit way. One cannot store objects or seat tagged passengers in an entry/exit way (Half of a container, trailer, passenger car) where such antennas are installed. In order to avoid false marker reading, one has to consider unusable valuable space to be wasted for antennas use. Unusable space is a crucial matter, especially in a cargo trailer, passenger car or within small building with partitions.

It should be noted Ghaffari teaches use of 4 antennas in a portal entry/exit for moving marker directional detection. The antennas are operating one at a time interval, one after the other in order to avoid RF collision, thus delaying marker reading speed. Therefore, an object or personnel carrying the marker passing portal antenna zone at fast speed will not be detected, or even if it is detected, the CPU will not be able to differentiate object or personnel carrying marker movement direction. Finally, since Ghaffari relies only on an RFID antenna interrogation system to detect movement of marked object, one can pass a marked object behind a antenna panel, a wall patrician, or an object or personnel tag on the outer side of a cargo trailer, or a passenger car without physically going through the portal and falsely log an object or a personnel into the system database.

Although the prior art cited above is useful, none of the inventions include a secure portal scanner for tracking objects and personnel, a portal scanner that can ascertain in a particular location the presence of a particular objects or particular personnel being carried by several modes of transportation such as vehicles, tractor-trailers, or within a defined geographic area such as warehouses and buildings. It is accordingly a substantial need to provide a secure electronic vehicle, cargo, and personnel tracking information system, which uses a portal scanner for tracking the present location of in a plurality of modes of transportation or at a plurality of physical locations.

BRIEF SUMMARY OF THE INVENTION

To enable monitoring objects or personnel by use of a secure portal scanner, a portal panel into which a first and a second plurality of photo optical sensors are vertically mounted is incorporated. The first detectors serving as first detectors and the second detectors serving second detectors are arranged with approximately 2 feet apart from each other. The detection signals generated by the first and second detectors are used by a portal reader comparator CPU for indicating directional movement of a mass. At least one or two temperature sensing infrared sensors are also installed in the portal panel for detecting human presence at a portal point of access, and a portal comparator CPU is used to indicate whether the passing object is a human being or not. An RFID antenna is installed within the portal panel for interrogating the RFID tag affixed to or carried by the objects or personnel, and for the portal comparator CPU to identify the tag.

The portal scanner as discussed above is capable of reading and identifying the object and personnel carrying tags, indicating the directional movement of the objects and personnel tags based on detection of the first and second sensors with or without sensing the human temperature, and for registering an object or human movement along a direction, along with RFID authentication detection. High-speed object or personnel moving directional detection and authentication are achieved mainly by use of fast detection response (10 ms) of optical sensors for directional movement detection and by use of RFID tag single antenna reader with reading speed of 50 ms. Total directional movement and authentication of object or personnel tag are accomplished within 50 to 60 ms, which prevents individuals from being able to remove the objects (i.e., throwing a package out off a cargo trailer) or personnel from jumping through an entry/exit way of a passenger car. The method requires the tagged object or personnel to be logged by the portal scanner as it passes the portal scanner. In order to log on an object or a person successfully, the tagged object or personnel passing through the portal scanner is read by optical detection sensors and the RFID read antenna, so as to register a valid tagged object or personnel direction movement in a database registry.

In one preferred embodiment, the portal scanner panel is tamper proof by use of built-in PIR, microwave or ultrasonic motion detector(s) covered with an invisible shield inside of the portal panel to prevent from any unauthorized opening or tampering of the portal panel. A portal unit location movement sensor is used to avoid any unauthorized moving or tempering of the portal panel. Additionally, the portal scanner unit contains a built in RF transmitter or transceiver to transmit all tag read data to a computer interface and or report such tamper event to the computer interface. The portal transceiver used in the present invention communicating with a supervisory data communication with the computer to ascertain the proper operation of said portal reader. The portal scanner communication with the computer interface could be a hard wire connection. The transceiver unit of the portal reader could be a wireless modem connected to a GPS receiver unit mounted within the portal reader to report the read tag data and the portal unit location information to a monitoring station or a web server. The computer interface or a web server contains alphanumeric or photographic information relating to each one of the tagged object or personnel in its database. When the portal scanner reads a particular tag, an alphanumeric and or photographic information relating to the scanned tag will be downloaded to the site computer monitor, such that the operator or security personnel is able to compare and identify the actual scanned object or personnel. When matching object or personnel alphanumeric or photographic information appears on the computer monitor or found in the internet server, the authenticity of the object or person is verified and registered in the database.

To secure the operation of the portal scanner, a built-in battery backup unit is implemented with a low battery detection and reporting circuitry. Since only one RFID antenna driver circuitry is required in a point of access (for larger area coverage a slave antenna could be added on the opposite side on same reader without sacrificing tag read speed). With multiple vertically mounted optical sensors spaced from each other by approximately 2 feet on each side of an antenna loop and use of the portal scanner structure, the physical space in an entry or exit way of a trailer, aircraft, railcar, building, etc., is minimized. Therefore, use of only one antenna reader makes the portal reader more economical and provides more cargo or personnel usable space, which makes the system more practical for use. In addition, the portal scanner could be used in conjunction with or incorporate a metal or explosive detection device which makes the system capable of detecting and identifying objects such as a luggage, packages or a pallets, or personnel carrying or containing metal objects or explosives.

A vehicle, product and personal tracking and control system is provided to record, store, maintain and retrieve a record of a plurality of locations and a plurality of objects or personal having transponders attached thereto and carried by various modes of transportation (e.g., vehicle, aircraft, ships, trains) or located within a defined geographic area or physical location (e.g., warehouse, office building) having a plurality of points of access. The object or personal tracking and control system a portal RF antenna with infrared sensors to identify and detect a moving direction while passing through a portal.

The control system provides and maintains automatically the records of locations of the objects and personal in real time. The includes a plurality of object and personal transponder tags mounted on respective objects or personnel moving for transmitting a unique identification signal respective objects and personnel, a plurality of portal RF antenna with infrared sensors each being installed at a point of access on a vehicle or at or in a building. With each portal RF antenna with infrared sensor devises, the RF antenna is operative to receive the identification signal transmitted from each object or personal transponder tag as the object and/or person moves through the point of access and the infrared sensors which are used to detect the direction the object or personal is moving. Each infrared sensor device generates a detection signal indicative of the direction of movement of the object or personal and an identification signal of the object or personal in response to the RF antenna reading device which receives the identification signal and transmits the identification signal to a reader comparator CPU for data processing and maintaining.

In one embodiment, a first infrared sensor is used for detecting an object or personal movement, an RF antenna is used to read the object or personal transponder tag unit and a second infrared sensor is used for detecting an object or personal movement. The RF antenna with the infrared sensors is installed at a plurality of points of access, at which the first and second infrared sensors are installed in a way that a first direction of movement is defined as the movement into a detection zone and a second direction of movement is defined as a movement out of the detection zone. In the preferred embodiment heat detection infrared sensors are used in the portal scanner device to determine the direction of an object as well as whether such object is a human or another object carrying an RFID tag. The portal scanner's CPU is also able to process and distinguish the detection signals and to determine whether the object was a human or another object. The portal scanner can also detect the presence or absence of an object passing the scanner as well as whether said object is a human or another object.

Additionally, instead of using an RF transponder, a bar-code reader could be utilized to identify objects or personal carrying a bar-code label. Further, apart from the IR directional mass movement detectors, ultrasonic movement detectors could be utilized.

DETAILED DESCRIPTION OF THE INVENTION

Figure 1:
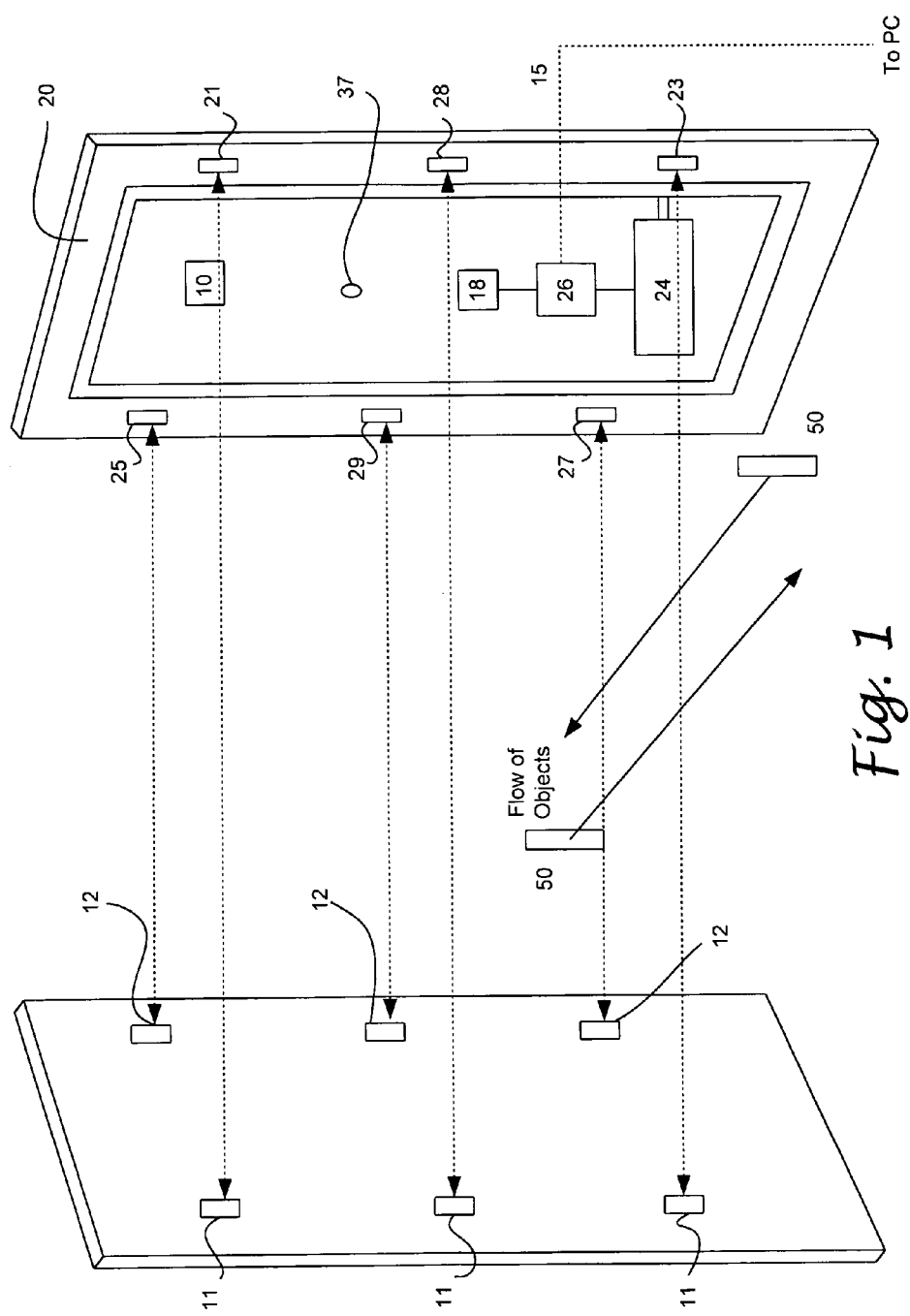
FIG. 1 illustrates a portal scanner panel with RFID read antenna and read CPU for readings RFID tags.

A vehicle, cargo, and personnel electronic tracking system is illustrated in FIG. 1 where a portal scanner is used to identify and detect directional movement of a mass such as an container, an object or a person carrying a tag 50, and transmit information of the detected movement to a computer interface. The portal scanner utilizes an improved object and human identification and movement direction detection system. The portal scanner comprises a pair of portal panels 20 between which the objects and/or human to pass through. The frontal panel material of the portal panels 20 is preferably plastic or wood, and side and back panel material of the portal panels 20 is preferably ferrous metal and aluminum for shielding the RF energy generated by a portal scanner antenna 22 mounted thereto, so as to prevent radiated antenna energy to travel towards the back and the sides thereof. The portal panels 20 comprise a first set of retro-reflective IR sensors installed in the portal panels vertically for detecting mass movement. In this embodiment, the first set of retro-reflective IR sensors include three IR sensors 21, 28 and 23 each paired with a reflectors 11 aligned therewith. The portal panels 20 are equipped with a second row of vertically arranged detectors 25, 27, 29 and reflectors 12, spaced apart from the first row of detectors by a distance of approximately 2 feet for detecting mass movement. A read antenna 22 is implemented in the portal scanner mounted on frontal panel 20. The read antenna is connected to a transponder read CPU 24 installed within the portal panel 20 to interrogate and read a passing RFID tag 50 carried by an object or person. The RFID read CPU 24, the first row IR sensors 21, 28, 23 and the second row of IR sensors 25, 29, 27 are connected to a reader comparator CPU 26, which is designed to determine the direction flow of an object or personnel based on which row of sensors detected a mass movement first and which row of sensors detected said mass movement afterwards. Once the movement direction is determined, the reader comparator CPU 26 is operative to send the collected data from said transponder read CPU 24 along with direction movement data of derived by the first and second row of sensors detection, to a computer interface through a hardwire connection 15, or to a GPS/modem/RF transceiver 18, which transmits the collected data to a computer interface unit, or to a web server.

In a preferred embodiment at least 2 of the retro-reflective IR sensors 22, 29 could be human body heat detection sensors and the comparator CPU 26 is able to differentiate said human body detection signals detected by said sensors 22, 29 and mass movement detection sensor signals generated by the retro-reflective sensors 21, 23, 25, 27, and transmit said human presence detection signal along with mass direction movement and identification information to a computer interface through a hard wire or wireless modem.

In a preferred embodiment, the reader comparator CPU 26 is equipped with a built-in digital counter, which will display the exact amount of objects and or personnel entry/exit count and displays entry/exit count information of passing object or personnel with or without carrying tag 50 on a separate count listing. The reader comparator CPU 26 is additionally equipped with a buzzer such that when an object or personnel passes through the portal without carrying a RFID tag 50, the reader comparator CPU 26 will beep one time, indicating to the operator an object or personnel pass through without carrying an RFID tag 50. If the passing object carries a RFID tag 50, the reader comparator CPU 26 buzzer will beep two times indicating to the operator the passing object or personnel is equipped with the RFID tag 50. The reader comparator CPU 26 of the portal scanner operation additionally could be user programmable to give audiovisual event report such as:

Only RFID tag reading detected by said portal comparator CPU=Audiovisual alarm.

Constant RFID tag reading for a preset period of time=Audiovisual alarm.

Detection of an object and or personnel movement without RFID=Audiovisual alarm.

Constant detection of non moving mass for a preset period of time=Audiovisual alarm.

Only human movement direction detection by said comparator CPU=Audiovisual alarm.

The portal scanner panel 20 as provided is also designed to be tamper proof. For example, the portal panel 20 comprises an inner motion detector such as a PIR, ultrasonic or microwave motion detector. To prevent unauthorized personnel from opening and tempering the portal scanner, in addition to the motion sensor 10, optical or pressure sensing tamper switches 37 are installed on the portal back and bottom panel side, facing towards the back or bottom of said portal panel 20, such that action of pressuring or pointing against a back wall, or the floor which said portal is standing on or installed against, and unauthorized removal of a portal scanner can be detected.

When an object or person carrying a RFID tag 50 passes through said portal scanner, depending on object or personnel direction movement, the portal scanner's first or second row of retro-reflective IR sensors detects a movement, and the comparator CPU 26 registers a direction movement, based on which sensors detected said movement first. If a temperature change is detected during the detection step, then the reader comparator CPU 26 identifies such detection being obtained from a human. If the temperature change is not detected during said movement detection, then the comparator CPU 26 registers directional movement belong to an object passing through the portal 20. At the same time the reader CPU 24 through the read antenna 22 will send an interrogation RF electromagnetic coded signal to the passing tag 50 which, upon receipt of said interrogating signal, will transmit a signal containing information. Upon receipt of the signal from the passing tag 50, the reader CPU 24 will read and transmit the tag RFID information to the comparator CPU 26. The Comparator CPU 26 transmits both said RFID and mass or human directional movement detection information to an RF transmitter which transmits said information to a computer interface through a wireless modem unit equipped with a GPS receiver unit 18. The GPS receiver unit 18 then transmits the presence identification signal and the directional movement information of the object or personnel along with the location information of the portal scanner and the object or personnel. The location information of the portal scanner is important and useful, particularly when the portal scanner is installed in a mobile environment, such as a passenger car, a cargo trailer, rail car, and aircraft, for example.

When any particular object or personnel information is received by a computer interface, the corresponding cargo or personnel information will appear on the monitor of the computer. If the monitoring computer is installed in a proximity to the portal scanner, the operator of the portal scanner can visually verify actual object or person at his or her visual sight, and compare it with alpha numeric and/or photographic information found in the computer database. This will help security personnel to be able to identify the authenticity of a cargo or personnel, especially at an airport terminal, secure employment area, warehouse distribution center, and retail merchandising. The computer or server could be installed at a distant location remote from the portal scanner. The detection information will then be transmitted and stored into the computer/server or into an Internet server. The information downloaded in the sever could be used for just in time management efficiencies, flow of distribution of products, monitoring of personnel attendance, driver/passenger location and or authentication, etc.

In a preferred embodiment of the present invention, the portal scanner additionally is equipped with tamper detection sensors 10, 37, to detect unauthorized tampering against the inner section of said panel 20 or for unauthorized removal of said panel 20. The tamper detection information will be sent to a computer monitor, and the computer will alert the operator with an audiovisual warning. The computer interface additionally communicates with said portal scanner unit with a supervisory encryption coded signal to secure proper operation of said portal scanner and to ascertain the proper communication leak between said computer and said portal scanner. The portal scanner of the present invention operates with AC power adapter or vehicle power supply, or alternatively, the portal scanner has a built-in rechargeable battery. If external power supply is being cut, the portal scanner comparator CPU 26 will transmit a unique coded signal to indicate that portal unit is operating on back up battery power.

Figure 2:
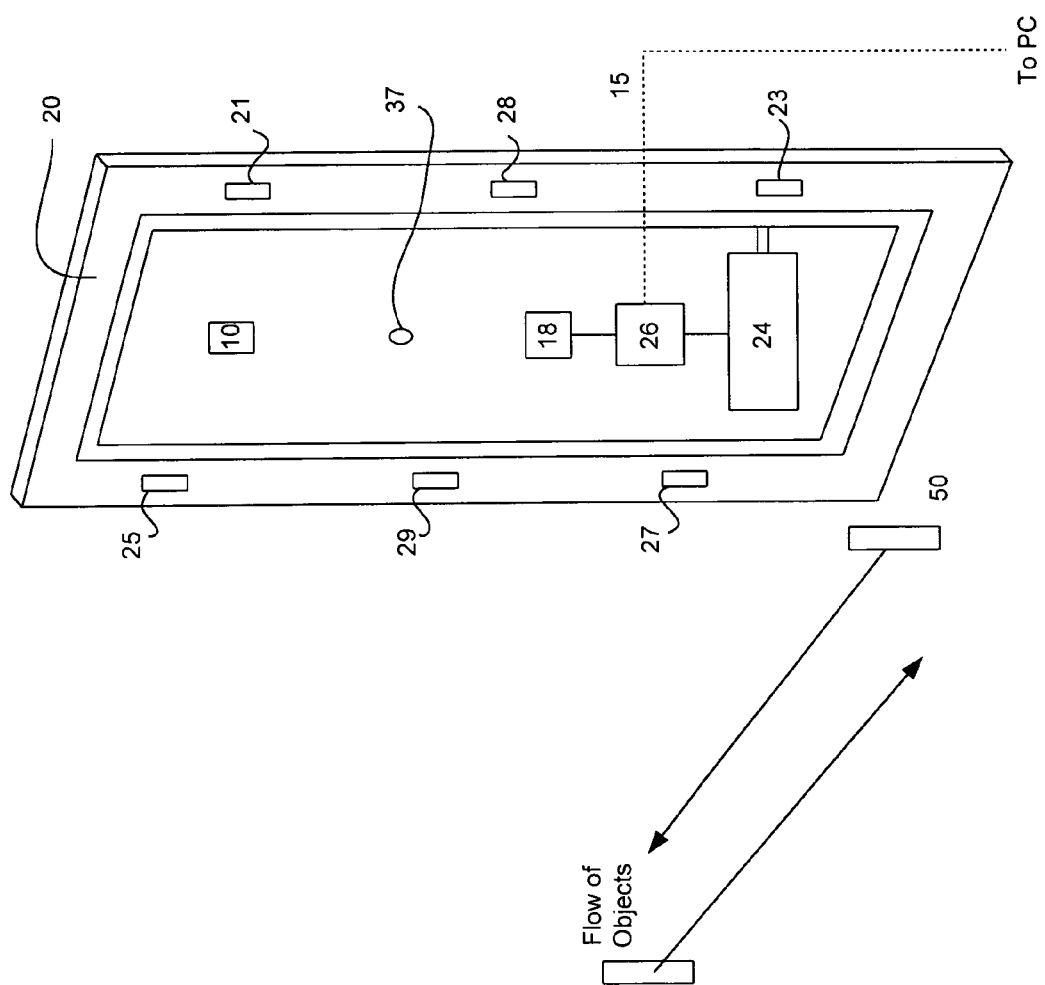
FIG. 2 illustrates a portal scanner panel with diffused reflection IR sensors for detection of direction movements of a mass.

FIG. 2 illustrates a similar method for the use of the art, without use of reflectors 11 and 12. In this embodiment, the retro-reflective IR sensors are replaced by diffused-reflection sensors 21, 24, 28, 25, 27, 29.

Figure 3:
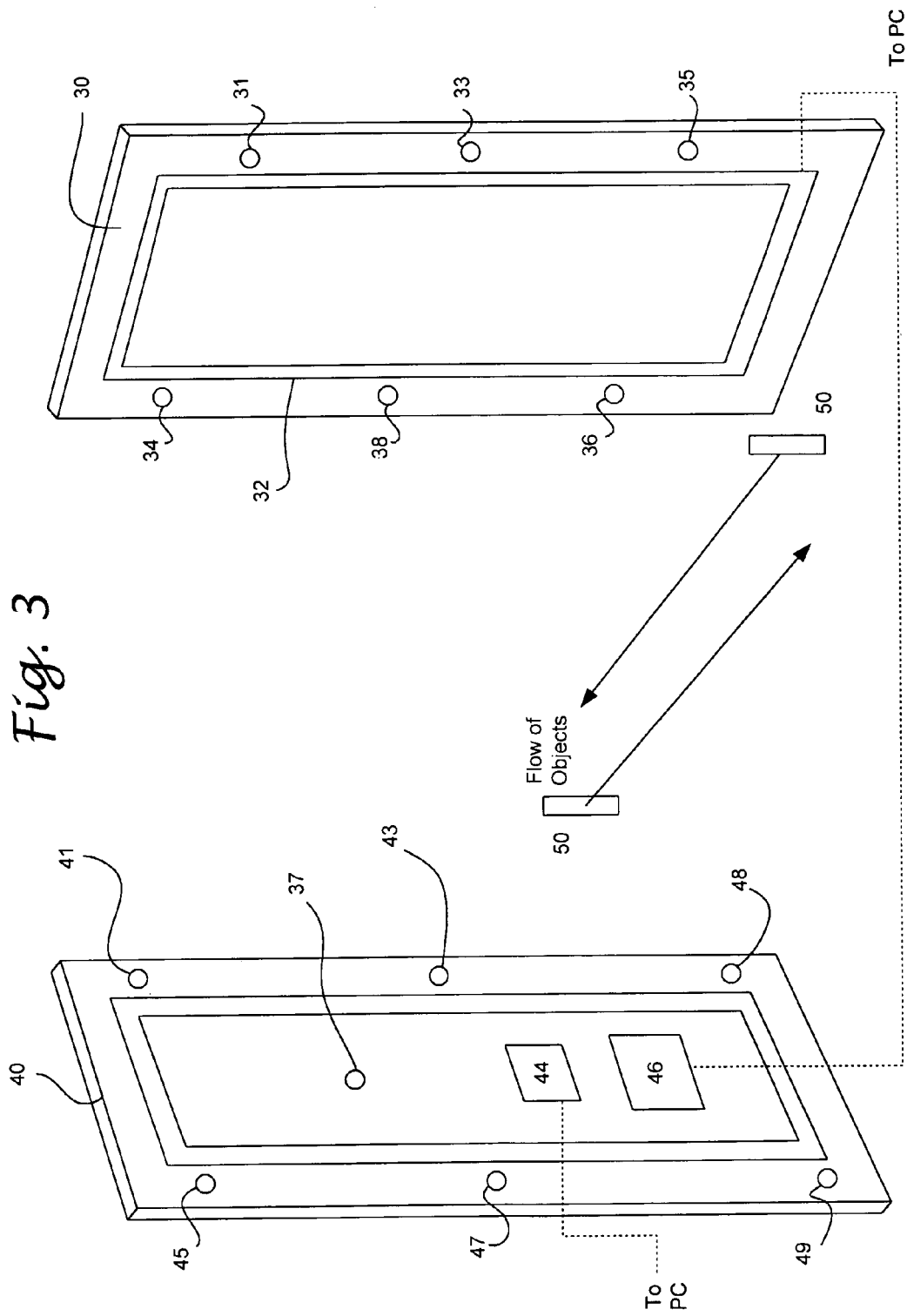
FIG. 3 illustrates a portal scanner with dual panel using a master and slave RFID antenna for reading RFID tags.
Figure 4:
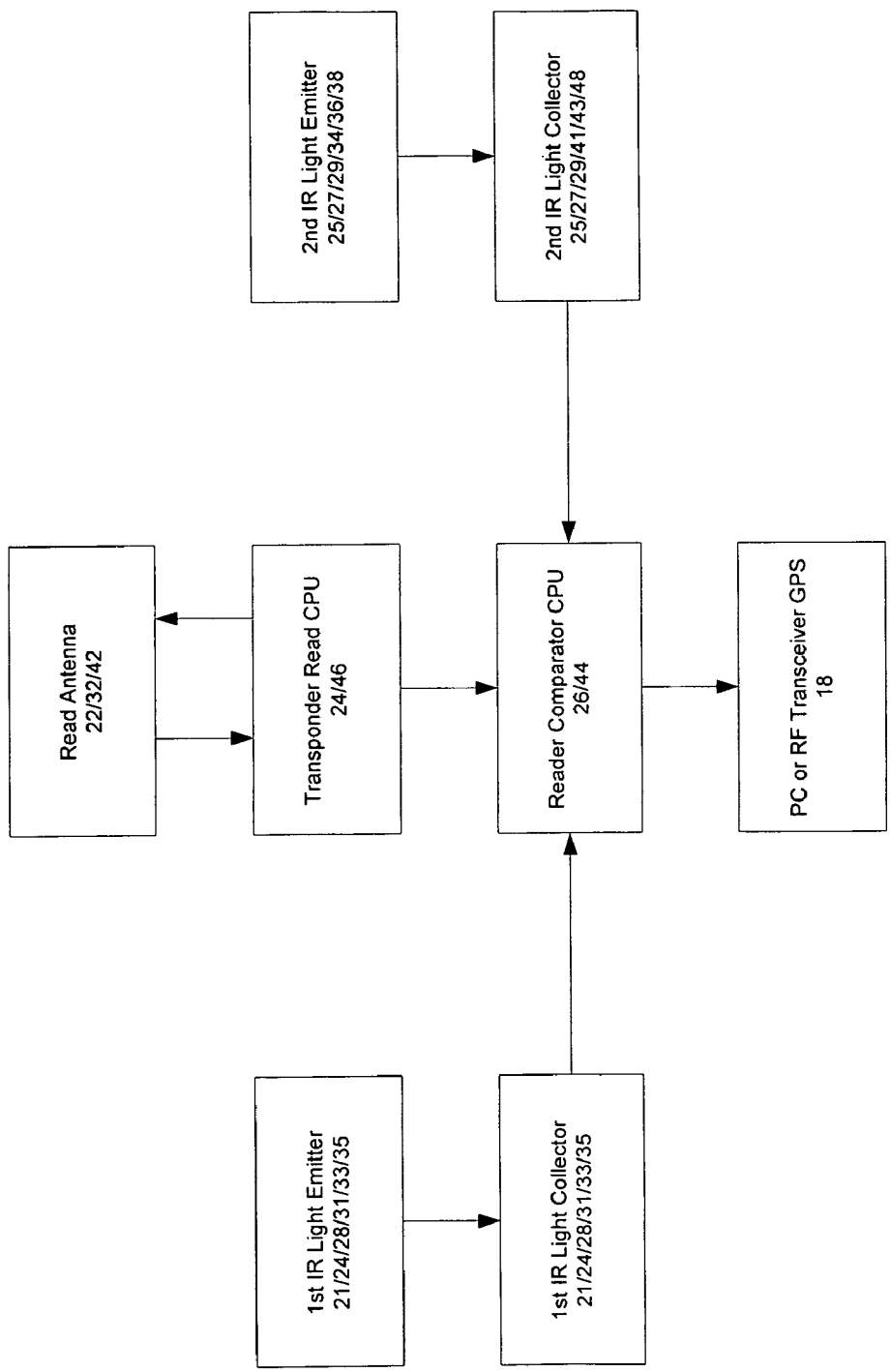
FIG. 4 is a block diagram of a portal scanner.

FIG. 3 shows 2 portal panels facing each other, including a master panel 40 and a slave panel 30. The master panel 40 comprises a read antenna 42 connected to an RFID read CPU 46. The use of optical beam detection method of mass movement is immune from simulated reflector sensor tampering. A first row of sensors optical collectors 45, 47, 49 are mounted vertically on frontal panel of the master portal 40, and a second row of sensors optical collectors 41, 43, 48 are mounted about 2 feet apart from the first row of vertically mounted sensors collectors 45, 47, 49. The sensor collectors 45, 47 and 49 are connected to a comparator CPU 44. The slave panel comprises a slave antenna 32 connected to the reader CPU 46, a row of vertically mounted optical sensor emitters 31, 33, 35 serving as first emitters, and a second row of emitters 34, 38, 36 mounted vertically on the slave panel 30 about 2 feet apart from the first row of emitters 31, 33 and 35. The use of a pair of antennas facing each other and sharing the same reader circuitry provides better RFID tag reading in a larger entry/exit area, since reflectors are not required or used for such through beam detection. Thus the use of through beam sensors eliminates the possibility of using a reflector to avoid the detector detecting mass directional movements.

What is claimed is:

1. A method for detecting and tracking a plurality of objects passing through or located in a predetermined portal area, comprising:
    detecting presence of the objects at a first position within the portal area;
    detecting presence of the objects at a second position within the portal area;
    identifying the objects by interrogating with tags attached to or carried by the objects; and
    determining direction of movement of the objects according to detection sequence between the first and second positions.

2. The method of claim 1, further comprising a step of determining whether the objects are human beings or not by sensing temperature of the objects.

3. A system for identifying and tracking an object passing through or located at a portal area, comprising:
    a tag carried by or attached to the object, the tag being encoded with unique identification information;
    a portal panel unit located at the portal area;
    a first set of detectors mounted on the portal panel unit to detect the object; and
    a second set of detectors mounted on the portal panel unit to detect the object, the second set of detectors being spaced from the first set of detectors by a predetermined distance.

4. The system of claim 3, wherein the tag includes a radio-frequency identification (RFID) tag or a barcode tag.

5. The system of claim 3, wherein each of the first and second sets of detectors includes a plurality of vertically arranged detectors operative to detect presence of the objects.

6. The system of claim 5, wherein each of the vertically arranged detectors includes a diffused-reflection sensor.

7. The system of claim 5, wherein each of the vertically arranged detectors includes an IR sensor and a reflector aligned with each other across the portal area.

8. The system of claim 5, wherein each of the vertically arranged detectors includes an optical emitter and an optical collector aligned with each other across the portal area.

9. The system of claim 3, wherein each of the first and second sets of detector further comprises a human body heat sensor to detect whether the object is a human being or not.

10. The system of claim 3, further comprising a comparator operative to compare detection sequence of the first and second set of detectors, so as to determine movement direction of the object.

11. The system of claim 10, further comprising a reader operative to receive detection information generated by the first and second sets of detectors and the RF antenna and to transmit the detection information to the comparator.

12. The system of claim 3, further comprising a programmable warning device to generate a signal when:
    a) no tag information of the object being detected is available;
    b) no object information of the identified tag is available;
    c) no movement of the object is detected;
    d) only human movement is detected; or
    d) any combination of the conditions of (a) to (d).

13. The system of claim 3, further comprising a built-in motion detector or a built-in pressure sensing temper switch.

14. A portal scanner, comprising:
    a first set of detectors operative to detect presence of an object at a first position within a portal area; and
    an RF antenna operative to interrogate a tag encoded with an identification code located within the portal area, wherein the tag is carried by or attached to the object.

15. The portal scanner of claim 14, the first set of detectors includes a plurality of vertically arranged detectors.

16. The portal scanner of claim 15, wherein each of the vertically arranged detectors includes a diffused-reflection IR sensor, a pair of IR sensor and reflector aligned with other across the first position, or a pair of an optical emitter and collector aligned with other across the first position.

17. The portal scanner of claim 14, further comprising a built-in motion sensor or a pressure sensing tamper switch for detecting movement of the portal scanner.

18. The portal scanner of claim 14, further comprising a comparator operative to count numbers of objects and tags being detected.

19. The system of claim 14, further comprising a second set of detectors spaced from the first set of detectors by a predetermined distance.

20. The system of claim 19, wherein the predetermined distance is about 2 feet.

21. The system of claim 19, further comprising a comparator operative to determine direction of movement of the object according to detection sequence of the object by the first and second sets of detectors.

22. The system of claim 19, wherein each of the first and second set of detectors includes an IR body heat sensor operative to detect whether the object is a human being or not.

23. The system of claim 19, wherein the first and second detectors each includes a plurality of vertically arranged IR detectors.

24. The portal scanner of claim 23, wherein each of the vertically arranged detectors includes a diffused-reflection IR sensor, a pair of IR sensor and reflector aligned with other across the second position, or a pair of an optical emitter and collector aligned with other across the second position.

25. The portal scanner of claim 14, further comprising a metal detector circuitry for detecting present of metal within the portal area.

26. The portal scanner of claim 14, further comprising an explosive detection circuitry for detecting presence of explosive material present within the portal area.

* * * * *